(12) United States Patent
Hernandez

(10) Patent No.: US 8,919,829 B2
(45) Date of Patent: Dec. 30, 2014

(54) PRESSURE RELIEF LATCH, HIGH REPEATABILITY

(75) Inventor: James R. Hernandez, Pomona, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 13/513,636

(22) PCT Filed: Dec. 3, 2010

(86) PCT No.: PCT/US2010/058962
§ 371 (c)(1),
(2), (4) Date: Jun. 4, 2012

(87) PCT Pub. No.: WO2011/069108
PCT Pub. Date: Jun. 9, 2011

(65) Prior Publication Data
US 2012/0242097 A1    Sep. 27, 2012

Related U.S. Application Data

(60) Provisional application No. 61/266,814, filed on Dec. 4, 2009.

(51) Int. Cl.
 E05C 3/14  (2006.01)
 E05B 51/02  (2006.01)
 B64D 29/06  (2006.01)

(52) U.S. Cl.
 CPC .............. *E05B 51/023* (2013.01); *B64D 29/06* (2013.01)
 USPC .......................................................... 292/228

(58) Field of Classification Search
 USPC ........................ 292/21, 92, 228, 93
 See application file for complete search history.

(56) References Cited

U.S. PATENT DOCUMENTS

| | | | | |
|---|---|---|---|---|
| 5,765,883 | A * | 6/1998 | Dessenberger et al. | 292/92 |
| 6,325,428 | B1 * | 12/2001 | Do | 292/113 |
| 6,513,841 | B1 * | 2/2003 | Jackson | 292/214 |
| 6,866,226 | B2 * | 3/2005 | Pratt et al. | 244/129.4 |
| 2005/0087996 | A1 | 4/2005 | Jackson et al. | |
| 2006/0214431 | A1 | 9/2006 | Helsley et al. | |

OTHER PUBLICATIONS

Search Report and Written Opinion issued in Int'l App. No. PCT/US2010/058962 (2011).

* cited by examiner

*Primary Examiner* — Kristina Fulton
*Assistant Examiner* — Christine M Mills
(74) *Attorney, Agent, or Firm* — Barnes & Thornburg LLP

(57) ABSTRACT

A pressure relief latch for use in securing panels on an aircraft. The latch includes an apparatus and method to retain the latch in a latched condition under certain conditions. The latch includes a detention assembly which includes at least a portion which has a coefficient of thermal expansion which differs from a housing of the latch.

10 Claims, 11 Drawing Sheets

PRESSURE RELIEF LATCH, HIGH REPEATABILITY

CROSS REFERENCE TO RELATED APPLICATIONS

This application is a U.S. nationalization under 35 U.S.C. §371 of International Application No. PCT/US2010/058962, filed Dec. 3, 2010, which claims priority to U.S. provisional patent application No. 61/266,814, filed Dec. 4, 2009. The disclosures set forth in the referenced applications are incorporated herein by reference in their entireties, including all information as originally submitted to the United States Patent and Trademark Office.

BACKGROUND

The present disclosure relates to a latch mechanism for latching a first panel to a second panel to prevent the first panel from opening with respect to the second panel, and in particular to a pressure relief latch mechanism used for securing dual purpose aircraft doors which can open at a predetermined internal pressure or opened from the exterior for routine maintenance and inspection purposes.

One application for such pressure relief latches is on aircraft engine cowls. Aircraft engines have high internal operating pressures, and aircraft designers wish to have the pressure release latch not operate until the internal pressure approaches very close to the maximum permitted pressure. Thus, the tolerances on adjustment and operation of the release latch become tighter and the requirements for repeatability become more intensive. The pressure relief latch is adjusted at the factory to operate at a specific pressure. Failures are sometimes encountered in the field after many hours of usage, and the aircraft operator desires assurance that the pressure release latch will operate when needed and will not operate prematurely. Variations in friction and contamination from use can affect the operation of the latches. Temperature changes can also affect latch operation by causing variations in spring rate, which may affect the latch effective release pressure.

SUMMARY

According to the present disclosure, a pressure relief latch mechanism comprises a housing for mounting on a first panel, a spring loaded detent carried within the housing, and a bolt having a pivot axis and pivotally mounted on the housing for latching engagement with a second panel. The bolt of the pressure relief latch mechanism is configured to open at a predetermined internal pressure and can be quickly opened from the exterior when it is desired to open the panels.

In illustrative embodiments, the detent includes a detent ball and a compression spring positioned along a central spring axis perpendicular to the pivot axis of the bolt. The bolt includes a curved exterior surface that is provided with a detent for receiving the detent ball. The curved exterior surface of the bolt is formed to include a groove that is configured to accept the detent ball to permit the detent ball to roll along the surface of the groove during movement of bolt from a locked first position to an open second position. The position of the detent ball is retained by a detent cup that includes a concave surface that engages the detent ball. The use of the groove and detent cup permits the detent ball to roll along the surface of the bolt during the operating cycle of the bolt.

In illustrative embodiments, the housing includes a pair of cylindrical bores that include a threaded opening at one end and a detent ball opening at the other end. The cylindrical bores are configured to house a pair of detent assemblies, each of which includes a detent ball, a detent cup, a detent spring, a thermo-expansion spacer and a threaded plug. The thermal-expansion spacer is made from a material that has a different coefficient of thermal expansion than the housing. The thermal-expansion spacer is configured to compensate for the change in detent spring rate at different temperatures.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWING FIGURES

The detailed description particularly refers to the accompanying figures in which.

DETAILED DESCRIPTION

Figure 1:
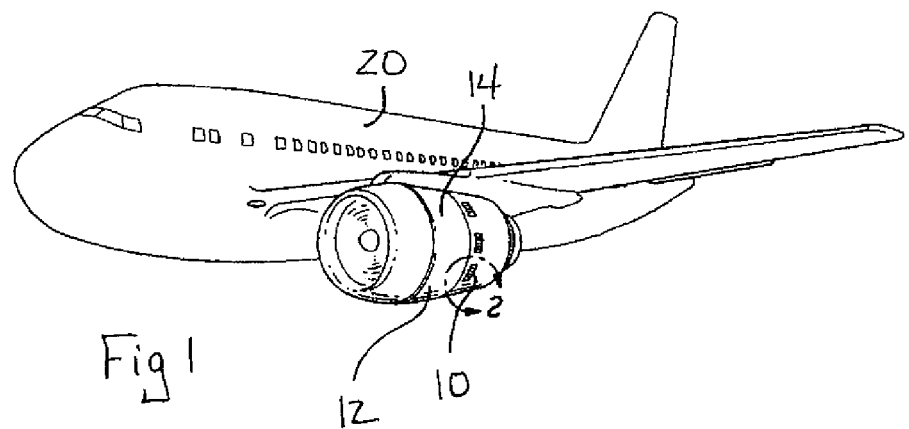
FIG. 1 is a perspective view of an airplane showing an engine provided with a cowling having access panels including pressure relief latches.
Figure 2:
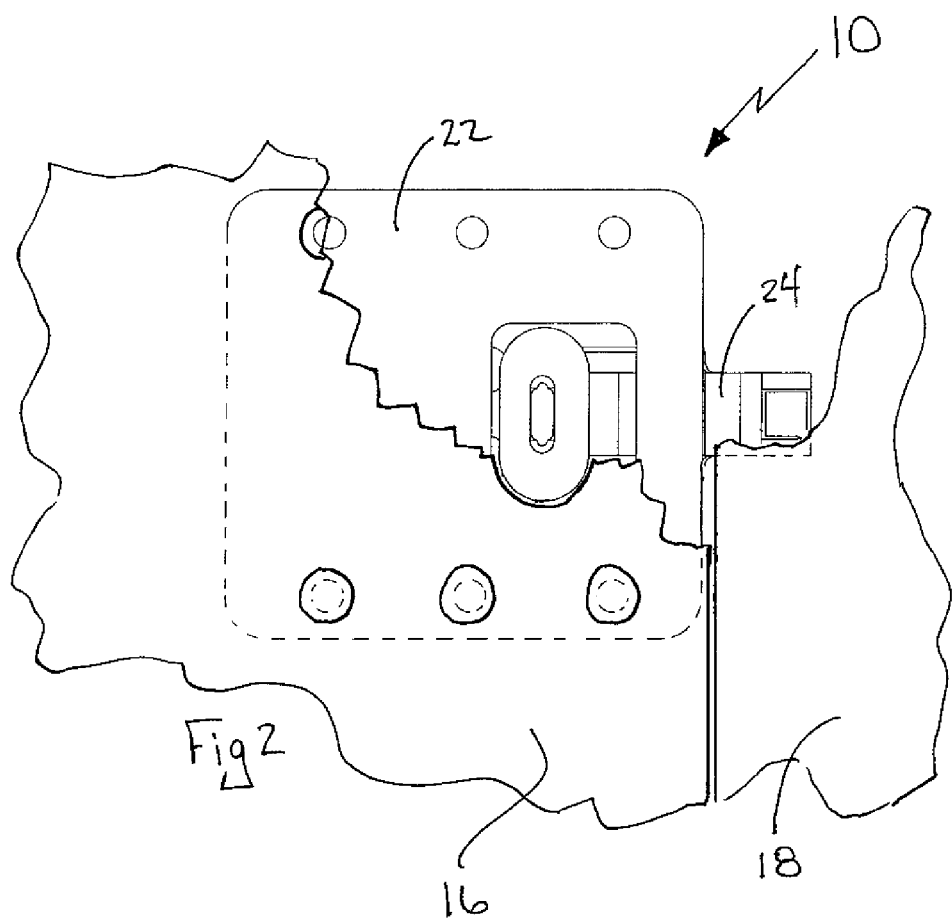
FIG. 2 is a enlarged partial view of an access panel showing a pressure relief latch mounted to the panel to retain the panel in a closed position.

A pressure relief latch 10 is shown coupled to the cowl 12 of an airplane engine 14, as shown in FIG. 1 to secure first and second access panels 16, 18 of an airplane 20, as shown in the illustrative embodiment of FIG. 2. Bolt 24 of pressure relief latch 10 is configured to open at a predetermined internal pressure and can be quickly opened from the exterior of the plane for routine maintenance and inspection purposes.

Figure 4:
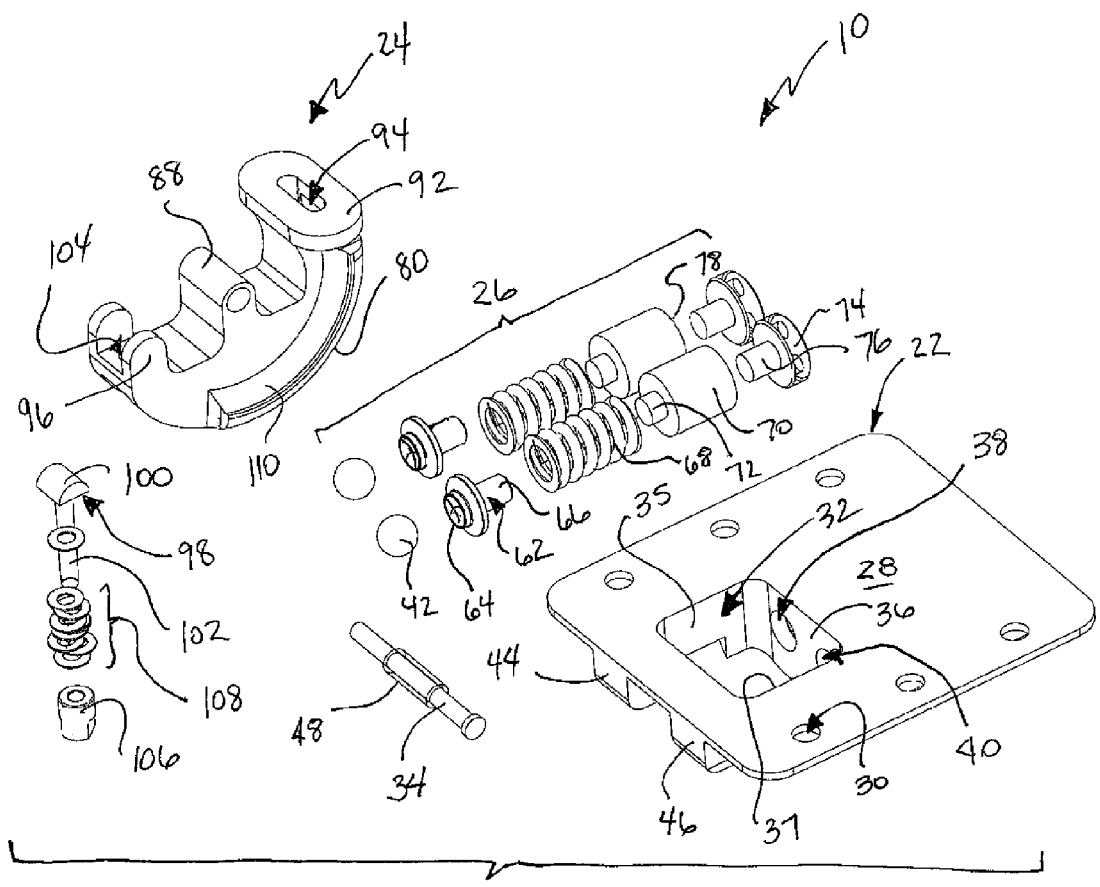
FIG. 4 is an exploded view of the pressure relief latch showing the housing, a pair of detent assemblies and the bolt.
Figure 5:
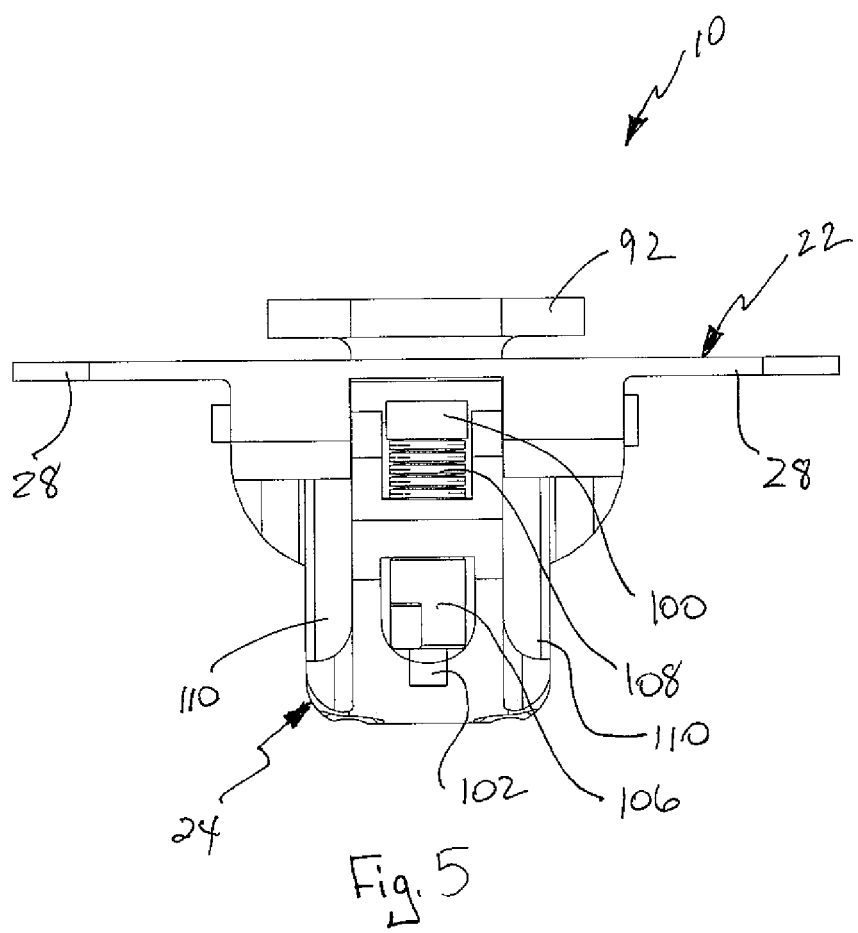
FIG. 5 is a front view of the pressure relief latch showing the bolt pivotally coupled to the housing.
Figure 6:
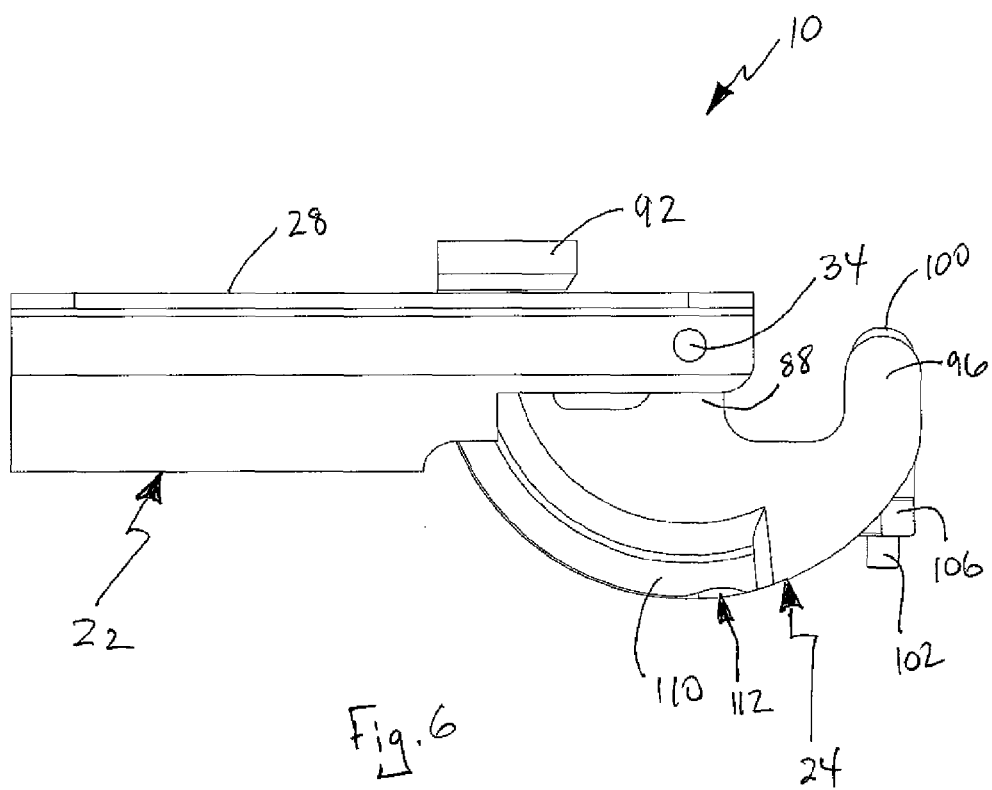
FIG. 6 is a side view of the pressure relief latch showing the bolt pivotally coupled to the housing.
Figure 7:
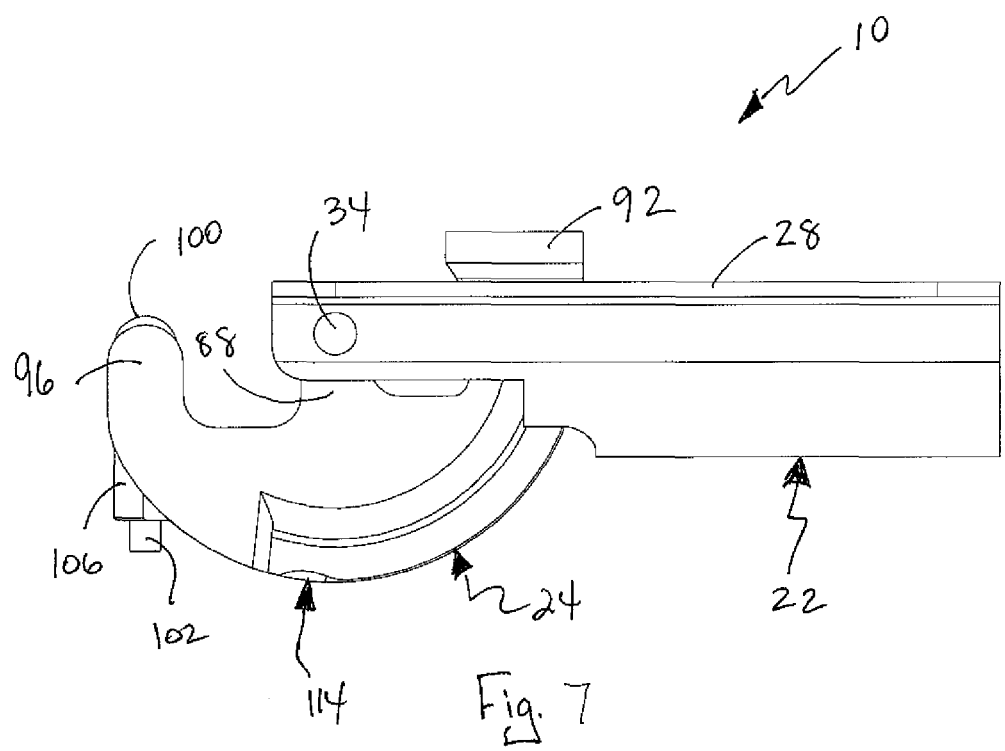
FIG. 7 is another side view of the pressure relief latch.
Figure 8:
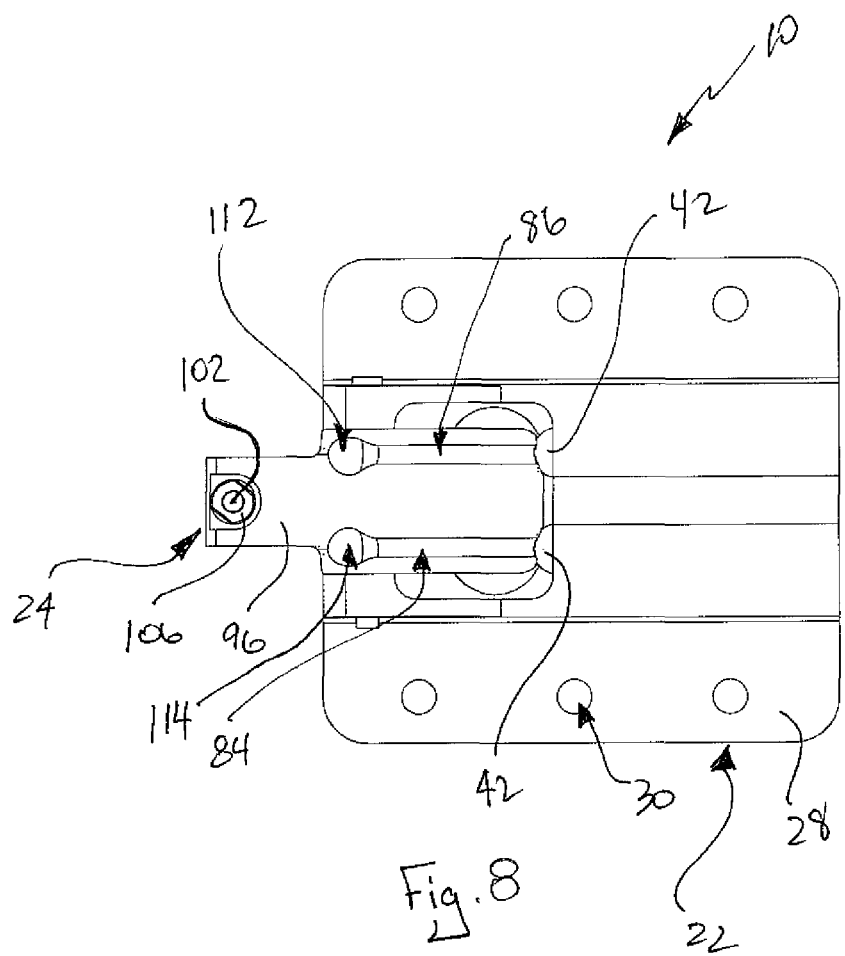
FIG. 8 is a bottom view of the pressure relief latch showing a pair of parallel grooves formed in the bottom surface of the bolt and showing a pair of detent balls positioned within the grooves.

Pressure relief latch 10 includes a housing 22 for mounting on the first panel 16, a pair of spring loaded detent assemblies 26 carried within housing 22, as shown, for example, in FIGS. 2 and 4. Pressure relief latch also includes a bolt 24 having a pivot axis and is pivotally mounted to the housing 22 for latching engagement with the second panel 18. Bolt 24 of the pressure relief latch 10 is configured to open at a predetermined internal pressure and can be quickly opened from the exterior when it is desired to open the panels 16, 18.

Housing 22 of pressure relief latch 10 houses detent assemblies 26 and permits the pivotal connection of bolt 24. Housing 22 includes a flange plate 28 that is configured to be coupled to first access panel 16. Flange plate 28 is formed to include a series of openings 30 that are used to secure housing 22 to first access panel 16. Rivets or other fasteners, such as bolts can be used to secure housing 22 to first access panel 16.

Housing 22 is formed to include a bolt passageway 32, as shown in FIG. 4. Bolt passageway 32 is configured to allow bolt 24 to move through bolt passageway 32 when bolt 24 pivots about pin 34 and bushing 48 from a closed position to an open position. Bolt passageway 32 of housing 22 is defined by sidewalls 35-37. Sidewall 36 is formed to include openings 38, 40 that are configured to permit the passage of detent balls 42 of detent assemblies 26.

Figure 11:
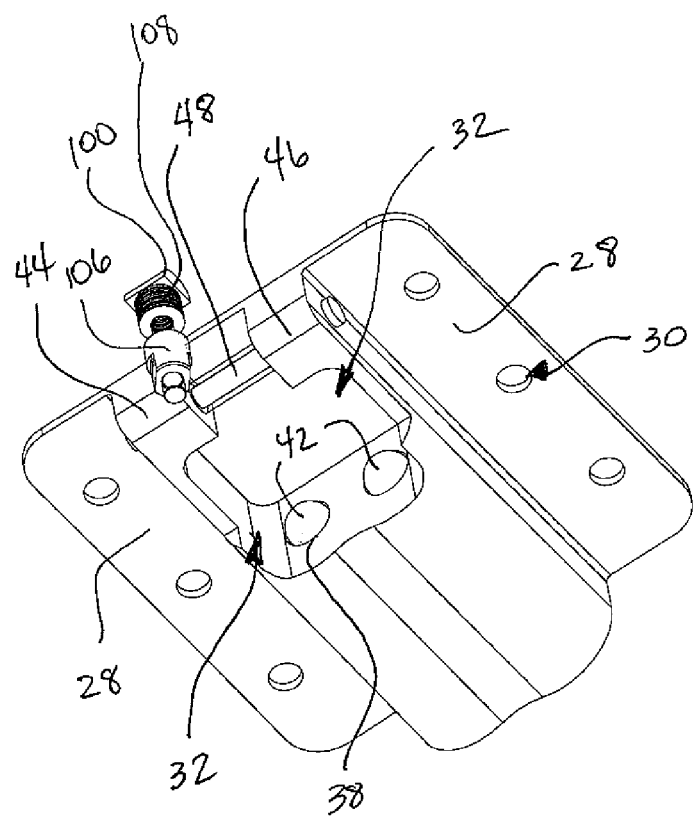
FIG. 11 is a perspective view of the pressure relief latch with the bolt removed showing the detent balls extending through a pair of openings formed in the housing.
Figure 12:
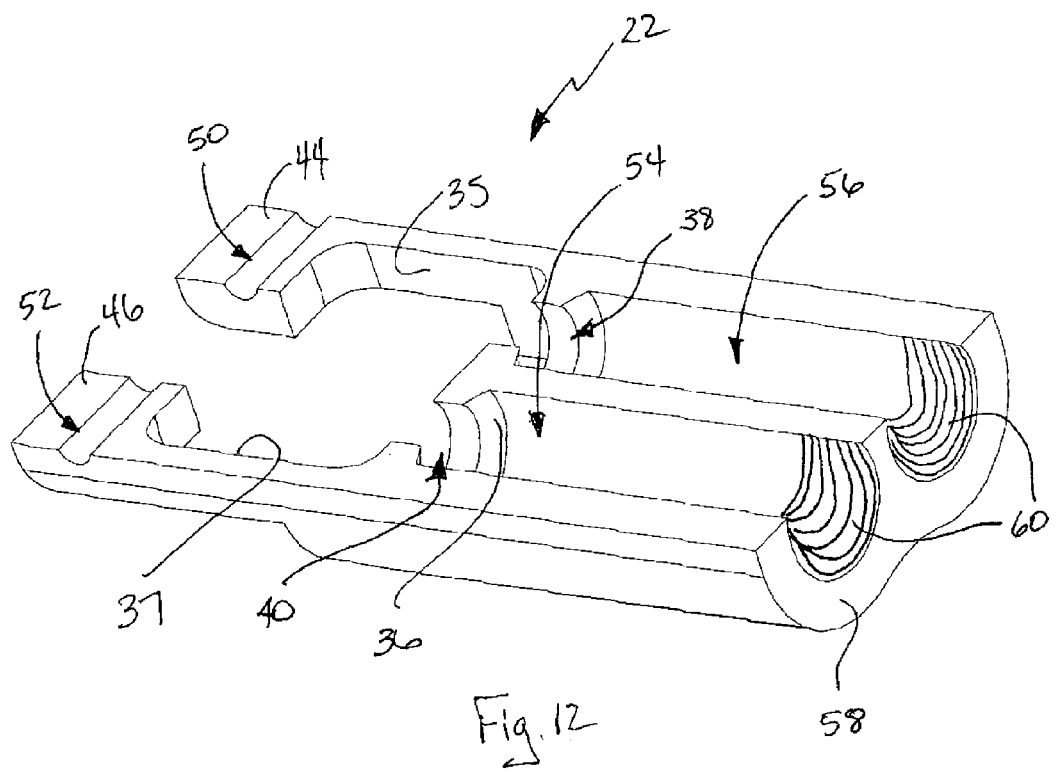
FIG. 12 is a sectional view taken along line 12-12 of FIG. 11 showing the cylindrical bores of the housing for containing the detent assemblies.

Housing 22 also includes bolt flanges 44, 46, as shown in FIGS. 4, 11, and 12. Bolt flanges 44, 46 include apertures 50, 52 that are configured to accept pin 34 for mounting bolt 24 to housing 22, as shown in FIGS. 11 and 12. Housing 22 also includes a pair of cylindrical bores 54, 56, which house detention assemblies 26. Cylindrical bores 54, 56 pass through end wall 58 of housing 22 and terminate at openings 38, 40 in side wall 36. Cylindrical bores 54, 56 include internal threads 60 used to secure detention assemblies 26. Threads 60 also allow for adjustability of detent assemblies 26.

Each of the detention assemblies 26 of pressure relief latch 10 include detent ball 42 and a retention cup 62 having a concave face 64 that is configured to engage the detent ball 42, as shown, for example, in FIG. 4. Retention cup 62 also includes post 66 that opposes concave face 64. Each detention assembly 26 also includes a compression spring 68 positioned along a central spring axis perpendicular to the pivot axis of bolt 24. Concave face 64 cups detent ball 42 to reduce friction and allow detent ball 42 to roll more freely.

The detention assemblies 26 also include expansion spacer 70, as shown in FIG. 4. Expansion spacer is made from a material that has a coefficient of thermal expansion that is different than housing 22. The use of an expansion spacer 70 that is made from a material with a different coefficient of thermal expansion allows for compensation in the spring rate of spring 68 at different temperatures. Use of expansion spacer 70 allows pressure relief latch 10 to yield consistent release loads from cycle to cycle and adjust for variations in temperature. As an example, if housing 22 is made from steel, expansion spacer 70 may be made form aluminum to allow for compensation during changes in temperature.

Expansion spacer 70 includes a post 72 that is co-linear with post 66 of retention cup 62. Detention assemblies 26 also include adjustment cap 74, as shown in FIG. 4. Adjustment cap 74 includes external threads that are configured to threadably engage threads 60 of cylindrical bores 54, 56. Adjustment cap 74 allows for adjustment of preload on detent ball 42. Adjustment cap includes post 76 that is co-linear with posts 66 and 72 and is configured to be positioned within a cavity 78 of expansion spacer 70. Use of expansion spacers 70 allows preload of detention assemblies 26 to be set at the factory and the preload to remain relative constant at varying temperatures.

Figure 3:
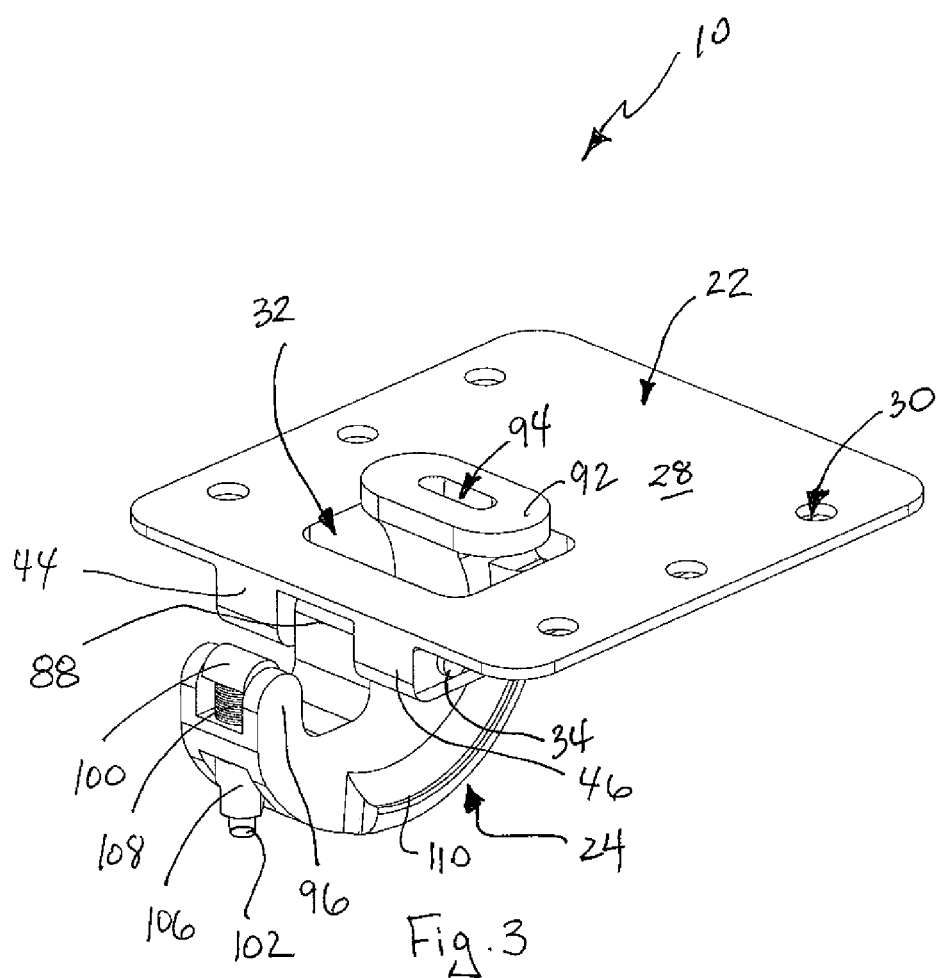
FIG. 3 is a perspective view of the pressure relief latch showing a housing and a bolt pivotally coupled to the housing.
Figure 9:
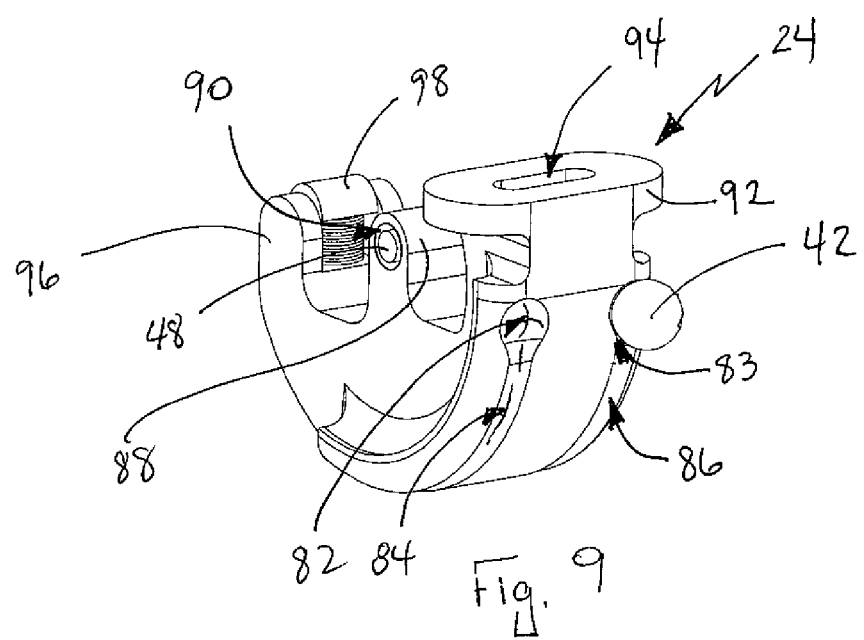
FIG. 9 is a perspective view of the bolt showing a detent ball positioned within a detent of the bolt and also showing a second detent and a pair of curved grooves extending along the bottom surface of the bolt.
Figure 10:
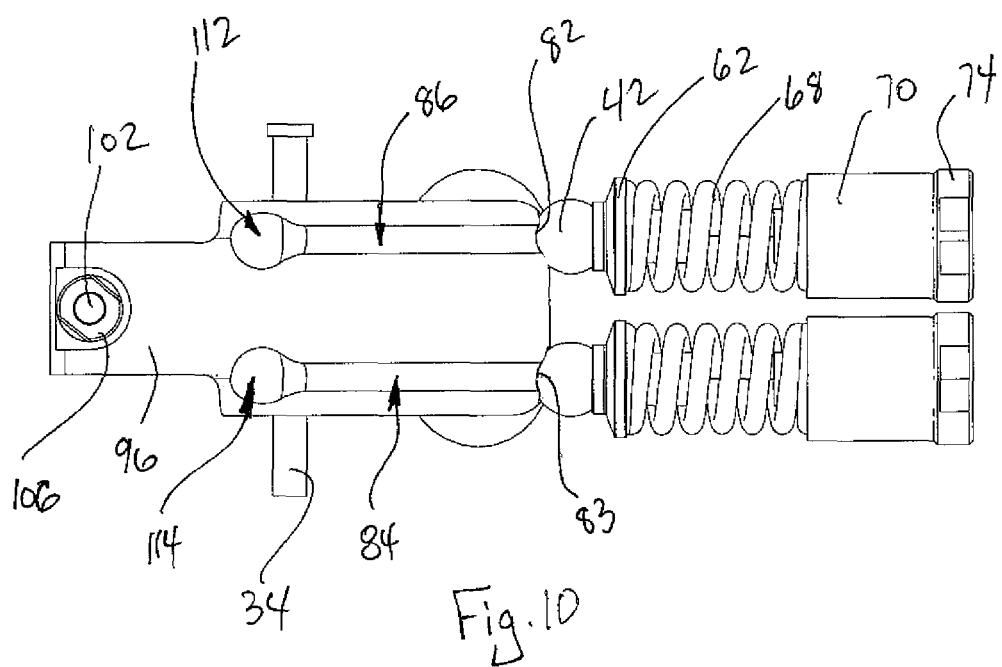
FIG. 10 is a bottom view of the pressure relief latch of FIG. 9 showing the detent balls of the detent assemblies positioned with in the grooves of the bolt.

Bolt 24 is pivotally coupled to housing 22 by use of pin 34 to move from a closed position to an open position, as shown, for example in FIGS. 3, 4 and 9. Bolt 24 includes a curved lower surface 80 and is provided with a pair of detents 82, 83 for receiving the detent ball 42. The curved lower surface 80 of the bolt is formed to include a pair of generally parallel grooves 84, 86 that are positioned to lie near detents 82, 83. Grooves 84, 86 are configured to accept detent balls 42 to permit detent balls to roll along the surface of the grooves 84, 86 during movement of bolt 24 from a locked first position to an open second position. Bolt also includes lower detents 112, 114 that are used to hold bolt in an open position. Lower detents 112, 114 are positioned to lie near a second end of grooves 84, 86 of bolt 24.

Bolt 24 includes mounting flange 88, as shown for example, in FIG. 9. Mounting flange 88 includes aperture 90 that is configure to accept sleeve 48 and pin 34. Bolt 24 also includes flush mounted release member 92 formed to include tool port 94. Tool port 94 is configured to accept a tool, such as a screwdriver, to allow bolt 24 to be pivoted to an open position. Bolt 24 further includes end fitting 96 having adjustable engagement post 98.

Engagement post 98 includes a head portion 100 and a threaded shaft 102 coupled to the head portion 100. Threaded shaft 102 is configured to be positioned within opening 104 formed in bolt 24. Threaded shaft 102 is secured to bolt 24 by use of nut 106 and the position of head portion 100 is adjusted by use of washers 108. Washers 108 allow for the proper positioning of head portion 100 to ensure that access panels are held closed tightly. Bolt 24 also includes arcuate flanges 110 that assist in guiding bolt 24 during movement.

Various features of the invention have been particularly shown and described in connection with the illustrated embodiment of the invention, however, it must be understood that these particular arrangements merely illustrate, and that the invention is to be given its fullest interpretation within the terms of the appended claims.

The invention claimed is:

1. A pressure relief latch mechanism comprising:
   a housing;
   a bolt coupled to the housing for pivotal movement between a first position and a second position, the bolt includes a pair of spaced apart detents on spaced apart sides of the bolt and a corresponding groove communicating with and extending along a portion of the bolt between each of the pair of spaced apart detents;
   a detention assembly configured to be positioned within the housing and including a pair of spaced apart detent balls, a ball support associated with each detent ball for supporting the corresponding detent ball, a detent spring and an expansion spacer associated with each detent ball wherein the expansion spacer has a coefficient of thermal expansion that differs from that of the housing in order to allow for compensation in the spring rate of the detent spring at different temperatures;
   wherein each detent ball is configured to selectively engage the corresponding pair of detents when the bolt is in the closed position and roll along the corresponding groove between the corresponding detents when the bolt is moved between the closed position and an open position.

2. A pressure relief latch mechanism of claim 1 wherein the detention assembly includes at least one adjustment cap for adjustment of preload on one of said each detent ball.

3. A pressure relief latch mechanism of claim 2 wherein the at least one adjustment cap includes threads for the adjustment of preload on one of said each detent ball.

4. A pressure relief latch mechanism of claim 1 wherein said each detent ball is supported by a retention cup having a concave surface configured to engage said each detent ball.

5. A pressure relief latch mechanism of claim 1 wherein the bolt includes a release member configured to allow the bolt to be pivoted to an open position.

6. A pressure relief latch mechanism of claim 5 wherein the release member is configured to accept a tool for pivoting the bolt to an open position.

7. A method of maintaining a panel in a closed position comprising the steps of:

attaching a latch mechanism to the panel wherein the latch mechanism includes a housing, a bolt coupled to the housing for pivotal movement between a first position and a second position, the bolt includes a pair of spaced apart detents on spaced apart sides of the bolt and a corresponding groove communicating with and extending along a portion of the bolt between each of the pair of spaced apart detents, and a detention assembly configured to be positioned within the housing in order to allow for compensation in the spring rate of the detent spring at different temperatures and including a pair of spaced apart detent balls, a ball support associated with each detent ball for supporting the corresponding detent ball, a detent spring and an expansion spacer associated with each detent ball wherein the expansion spacer has a coefficient of thermal expansion that differs from that of the housing;

adjusting the detention assembly to adjust the retention force used to hold the panel in a closed position; and closing the panel so the bolt of the latch mechanism holds the panel in a closed position.

8. The method of maintaining a panel in a closed position of claim 7 wherein the step of closing the panel includes adjusting an end fitting of the bolt to ensure that the panel is closed tightly.

9. The method of maintaining a panel in a closed position of claim 7 wherein the step of adjusting the detention assembly includes rotating a threaded adjustment cap thereby adjusting the preload on one of said each detent ball.

10. The method of maintaining a panel in a closed position of claim 7 further including the step of providing the bolt with a tool port whereby a tool configured to fit into the tool port is operable to pivot the bolt.

* * * * *